July 2, 1940.  J. F. HIGBEE  2,206,534
SPUTUM CONTAINER FOR MOTOR VEHICLES
Filed June 12, 1939   2 Sheets-Sheet 1
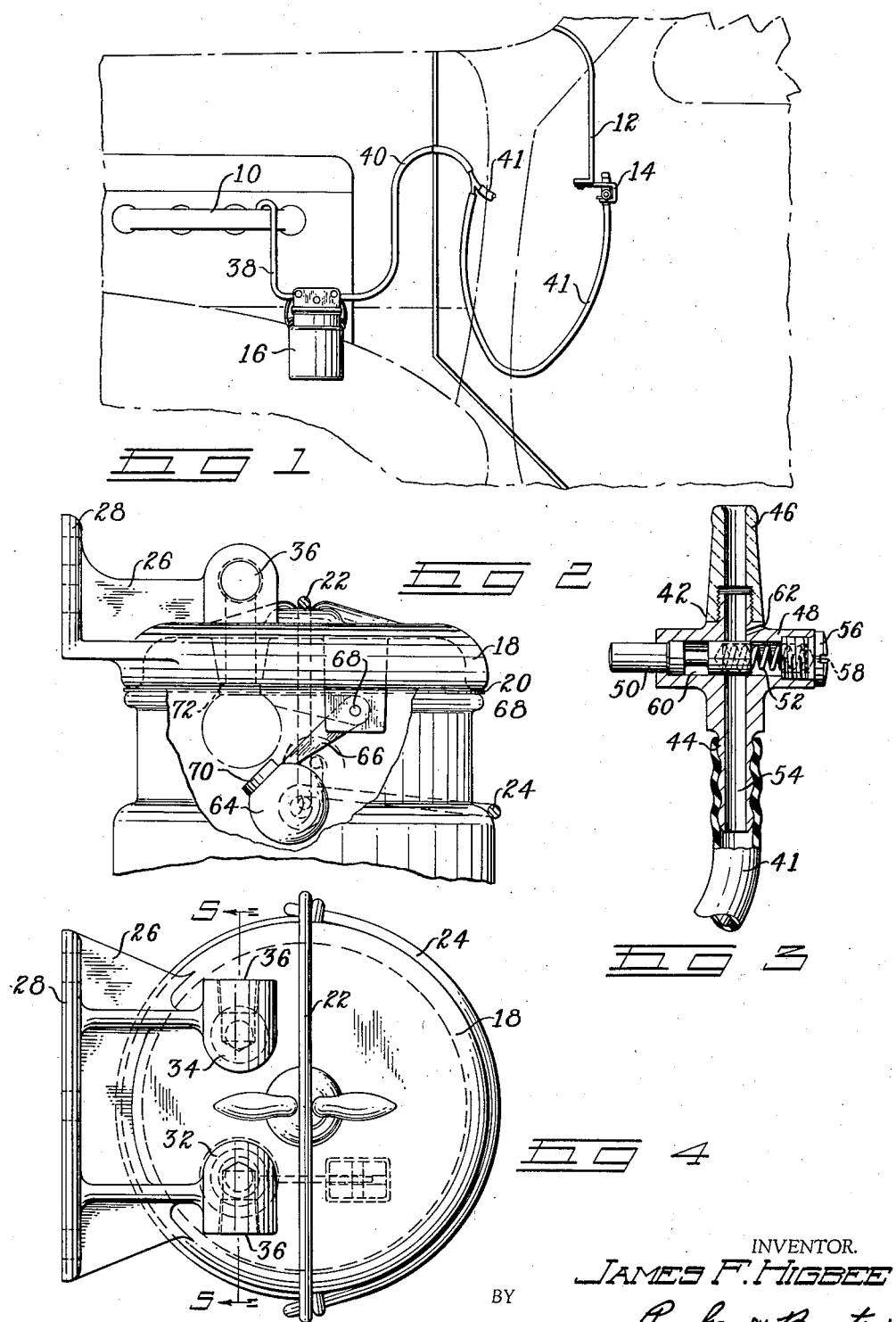
INVENTOR.
JAMES F. HIGBEE
BY Parker & Burton
ATTORNEYS.

July 2, 1940.  J. F. HIGBEE  2,206,534
SPUTUM CONTAINER FOR MOTOR VEHICLES
Filed June 12, 1939  2 Sheets-Sheet 2
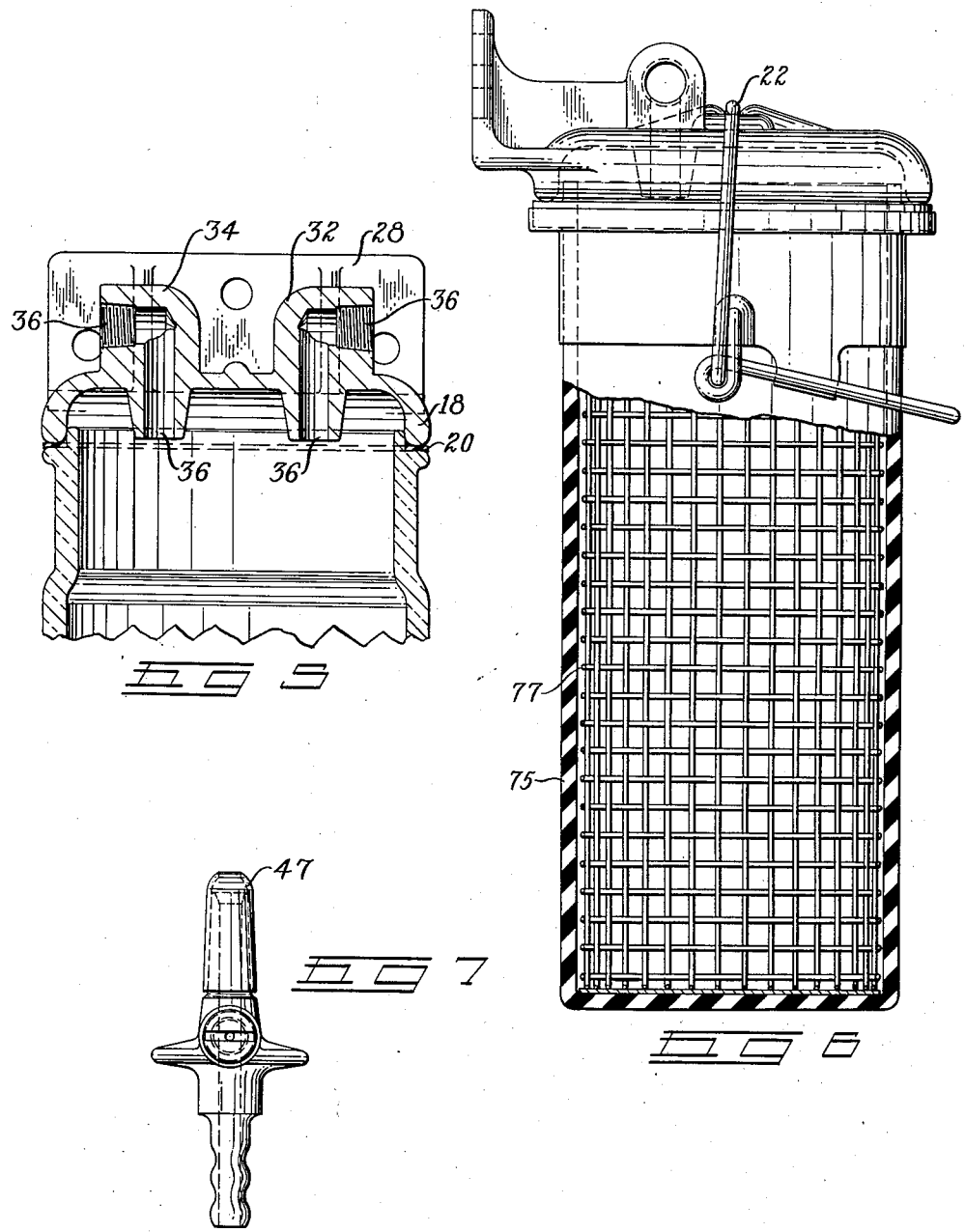
INVENTOR.
JAMES F. HIGBEE
BY
Parker & Burton
ATTORNEYS.

Patented July 2, 1940

2,206,534

UNITED STATES PATENT OFFICE 2,206,534

SPUTUM CONTAINER FOR MOTOR VEHICLES

James F. Higbee, Detroit, Mich.

Application June 12, 1939, Serial No. 278,738

6 Claims. (Cl. 4—258)

My invention relates to an improved sputum receiving container particularly adapted for motor driven vehicles such as automobiles.

In the driving of a motor vehicle such as an automobile, expectorating by a passenger through an open window, which is the usual practice, is inconvenient and unsatisfactory and unsanitary. For the driver of the vehicle to do so is attended with the risk that results from looking away even momentarily from the road. It is also inconvenient and unsatisfactory to carry a sputum container within the passenger compartment of the vehicle. If a passenger chews tobacco or is subject to a cold such expectorating may be of frequent occurrence.

An object of my invention is to provide a sputum container which is sanitary and concealed and which is provided with means rendering the same readily usable at all times while the engine of the vehicle is running.

A further object is to provide a sputum container and a sputum receiving mouth piece which mouth piece communicates with a depression chamber of the engine of the vehicle through the interior of the container to deposit sputum which is delivered to the mouth piece into the container.

A meritorious feature is the provision of a sputum receiving and containing mechanism which includes a sputum container communicating through a vacuum passageway with a depression chamber such as the intake manifold of the internal combustion engine of a vehicle and which system also includes a sputum receiving mouth piece which communicates with said depression chamber through a vacuum passageway which includes in part the interior of said container and its vacuum communication with the depression chamber. Manually operable valve means is provided controlling the vacuum suction on the mouth piece. Valve means is further provided responsive to the contents within the sputum container controlling the vacuum communication between the container and the depression chamber.

The assembly is readily attachable as a unit to the standard motor vehicle and without any change in the working construction thereof. With the exception of the mouth piece it is entirely concealed. It is simple and comprises very few parts and is inexpensive to build and install. It may be readily added as an accessory or it may be easily installed as standard equipment.

Other objects, advantages, and meritorious features of the invention will more fully appear from the following description, appended claims, and accompanying drawings, wherein:

Figure 1 is a side elevation of a fragment of a conventional motor vehicle body and engine compartment showing my invention installed therein, Fig. 2 is a side elevation of a fragment of the container which forms a part of my invention.

Fig. 3 is a sectional view through the mouth piece showing the interior thereof, Fig. 4 is a plan view of the container cover, Fig. 5 is a vertical sectional view taken on line 5—5 of Fig. 4, and Fig. 6 is a view partly in section showing a modified type of container structure, and Fig. 7 illustrates a modified mouth piece.

My invention is shown as applied to an automobile which is provided with a passenger compartment and an engine compartment. Within the engine compartment is located the usual internal combustion engine having an intake manifold 10 which constitutes a depression chamber at the time the engine is running. As is usual, the engine compartment is closed off from the passenger compartment by a dash structure which is not shown in the drawings but is of conventional type and the interior of the passenger compartment is provided with the usual instrument board panel 12, which panel is here shown as provided with a bracket 14 adapted to engage and support a mouth piece hereinafter more fully described.

I provide a sputum container which is fully enclosed and of any convenient size and is here shown in the form of a canister 16 which may be formed of glass or any other suitable sanitary material. This canister includes a cover portion 18 which seats over the mouth of the container proper and a gasket 20 may be provided to form a tight seal. Releasable clamping means 22 in the form of a wire loop which seats over the top of the cover and is held under spring tension by a cooperating portion 24 may be employed to hold the cover in place. This clamping means is of a type which is conventional in fruit jars. Any type of securing means might be employed. The object is to provide an air tight container. The support for the container is here shown as being through the cover which has an extension 26 that terminates in a bracket 28 which may be attached by bolts or screws to the engine casing or at any convenient place within the engine compartment of the vehicle.

The cover 18 of the container is provided with a pair of bosses 32 and 34. Each boss has a passageway 36 extending therethrough and through the cover into the interior of the container. A vacuum line or conduit of suitable material which may be flexible rubber tubing 38 provides communication between the interior of the container through the passageway 36 in one of the bosses such as 32 with the intake manifold 10. A tubular fitting may be secured in the manifold and adapted to receive the other end of the conduit 38 in a manner which is well understood. This places the interior of the container in communication with the depression in the intake manifold. A second vacuum line or conduit 40 communicates at one end with the passageway 36 through the boss 34 and this conduit is provided at its outer end with a mouth piece indicated generally as 42 and shown specifically in Fig. 3. In the construction of Fig. 1 the conduit 40 is shown as provided with two branches 41, each of which branches may be fitted with a mouth piece, but only one of which is shown here as so provided.

The mouth piece may be formed of Bakelite or any suitable material and comprises a tubular fitting which has one end 44 adapted to be connected with the flexible tube 41 and which has a removable mouth piece portion proper 46. This mouth piece might be of the same material or it might be provided with a sanitary cover formed of cheap material as of paper, which could be thrown away, and other mouth piece covers substituted, as shown in Fig. 7 wherein a removable paper mouth piece cover 47 is shown.

The mouth piece assembly is provided with a barrel like portion 48 within which is seated a manually operable control valve 50 held by a spring 52 to normally close the passageway 54 through the mouth piece. One end of the spring is shown as received within a recessed portion of the valve and the opposite end of the spring bears against a screw threaded plug is apertured at 58 to prevent pocketing of air and to render the valve easily operable. The valve itself has a reduced portion 60 which, upon movement of the valve plunger inwardly, will be brought into registration with the passageway 54 to establish vacuum communication with the outer end of the mouth piece proper 46. An air vent 62 is provided which extends through the wall of the mouth piece as shown in Fig. 3.

A control valve is provided within the container. This control valve may be in the form of a hollow float 64 carried by an arm 66, which arm is pivoted at 68 to the cover. The valve has a portion 70 which is adapted to close against the valve seat 72 formed on the boss through which the passageway 36 extends that leads to the intake manifold so that when the ball 64 is lifted by the fluid in the container until it is brought close to the seat 72 suction in the passageway 36 from the intake will draw the valve to its seat and close it and cut off the suction in the container so that the container will not function to withdraw sputum thereinto and will not therefore overflow.

In Fig. 6 there is illustrated a different type of container. The container in Fig. 6 is expansible in order that if the liquid in the container should freeze in the winter time it would not break the container. The container of Fig. 6 may be formed of rubber or some other suitable substance having a flexible wall 75 and which is supported over a rigid open work frame 77 which might be formed of metal so that the container would not collapse under suction but would be permitted to expand should such be necessary as by freezing of the contents. The cover may be formed of some hard material or reinforced material so that it will carry the necessary mechanism and may be of the construction heretofore described as relating to the embodiment of Figs. 1 to 5 inclusive. The expanded metal inner frame might be provided with a neck which receives the cover and a suitable gasket 20 might be provided to form a tight seal. The other mechanism would be as shown in the view in Fig. 2. This container would be substituted for the one shown in Figs. 2 and 4. Otherwise the system would be the same.

In the functioning of the device the suction in the manifold will maintain a depression in the container during the running of the engine. This depression will be communicated to the mouth piece but will be normally shut off from the mouth piece proper by the manual valve 50. The reason for this is that it is not desirable to bleed this amount of air constantly into the intake manifold. When the device is desired for use the user will bring the mouth piece 46 to his mouth and opening of the valve 50 will establish a depression which will withdraw the sputum through the tube 41 and 40 into the container. It will be found that the suction is sufficient that the sputum will be withdrawn rapidly and without clogging of the line and that the valve 50 will return to the normally closed position immediately upon release. The air vent 62 will prevent too much suction being placed on the lips or tongue of the user.

A plurality of these devices may be provided if desired. The container is removable in order that it may be emptied when desired. It will appear that everything is concealed except the mouth piece and that portion of the flexible tube which extends through the dash.

What I claim:

1. In a motor vehicle having a passenger compartment and having an engine having a depression chamber, a sputum container, a vacuum passageway leading from the depression chamber to the interior of the container, a vacuum line leading from the interior of the container to the passenger compartment and provided with a nipple mouth piece, and a manually operable valve controlling the communication between said mouth piece and the container.

2. In a motor vehicle having a passenger compartment and a depression chamber, a sputum container, a vacuum line leading from the chamber to the interior of the container, a vacuum line leading from the container to the passenger compartment and fitted with a nipple, manually operable valve means controlling the communication through the nipple to the container, and valve means responsive to the contents within the container operable to shut off communication between the container and the depression chamber.

3. In combination, a vehicle having a depression chamber, a sputum container, a vacuum line leading from the champer to the interior of the container, a sputum receiving nipple communicating through a vacuum passageway with the interior of the container, manually operable valve means controlling the passageway through said nipple, said nipple having a normally open air vent into the passageway therethrough between the sputum receiving end thereof and the container.

4. In a vehicle, a depression chamber, a sputum container, a sputum receiving nipple communicating through a vacuum passageway including the interior of the container and a flexible extension with said depression chamber, and valve mechanism responsive to the contents in said container to control the vacuum communication between the container and the depression chamber.

5. In a vehicle, a depression chamber, an expansible sputum container, means for preventing collapsing thereof, said container communicating through a vacuum passageway with the depression chamber, and a sputum receiving nipple communicating through a vacuum passageway with the interior of the container.

6. The invention defined in claim 1 characterized in that the nipple mouth piece is provided with an atmospheric passageway therethrough into the vacuum passageway, which atmospheric passageway is located between the end of the nipple and the valve.

JAMES F. HIGBEE.